Oct. 5, 1954  R. A. MELDRUM  2,690,822
VEHICLE SIDE WALL
Filed Sept. 11, 1950  5 Sheets-Sheet 1
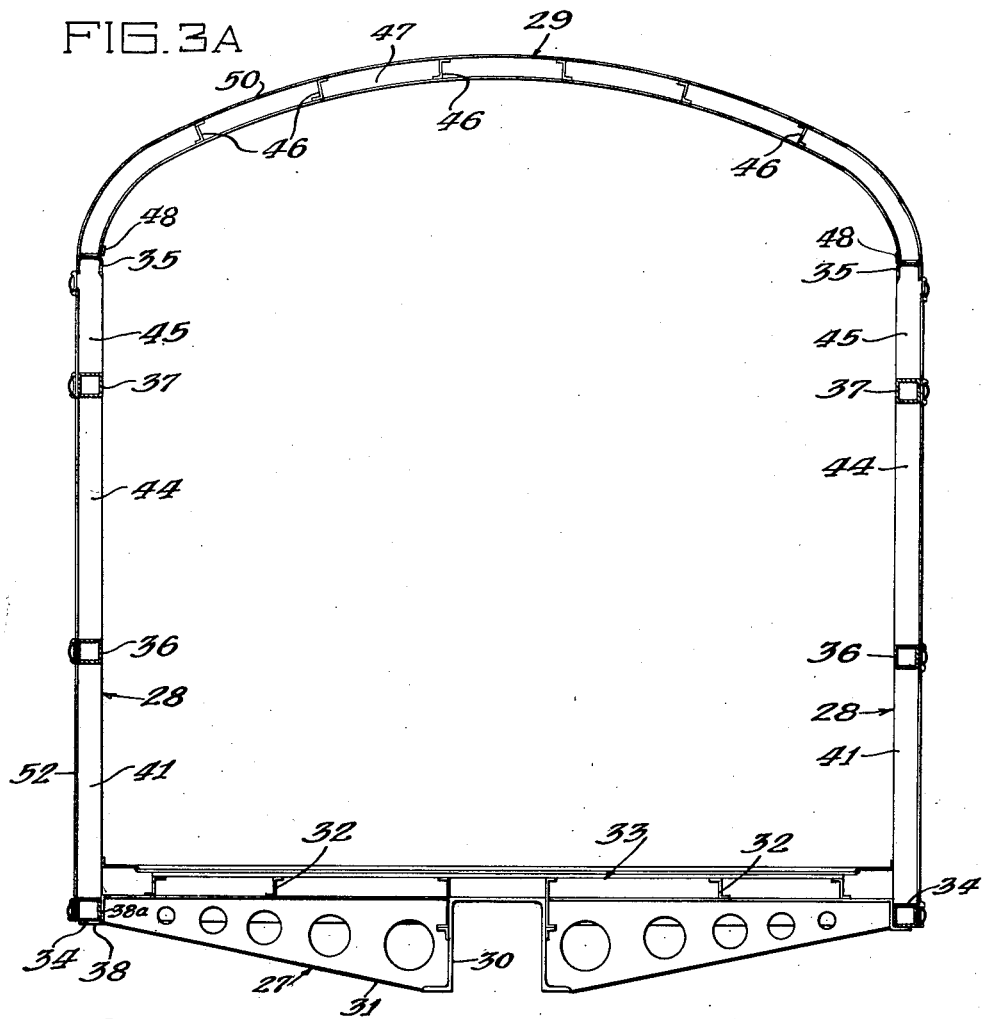
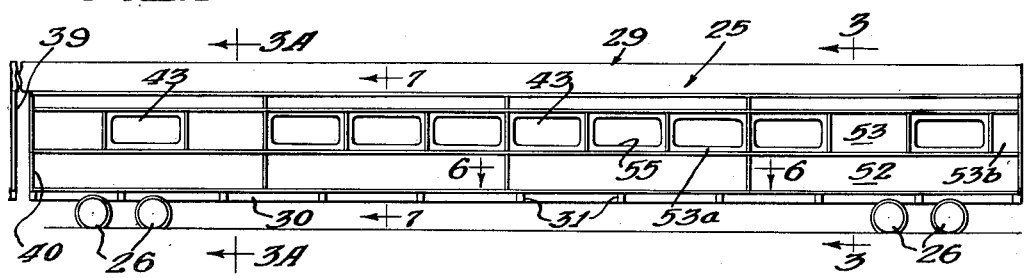
INVENTOR.
Robert A. Meldrum
By Zabel & Gritzbaugh
Attorneys

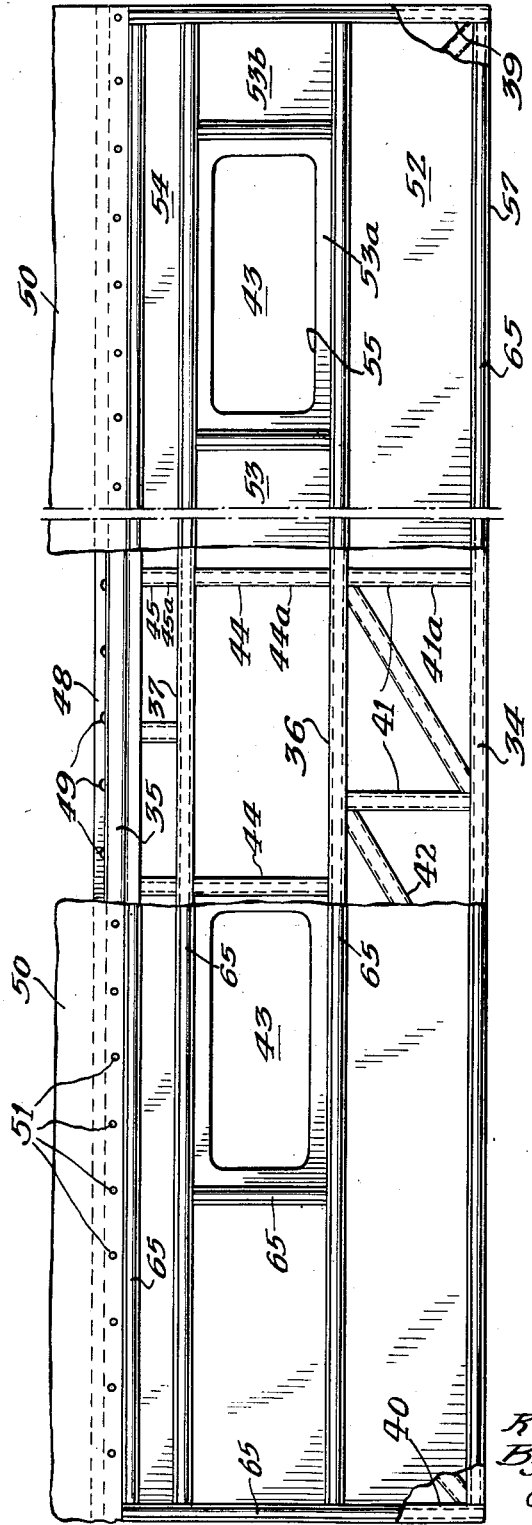

Oct. 5, 1954
R. A. MELDRUM
2,690,822
VEHICLE SIDE WALL
Filed Sept. 11, 1950
5 Sheets-Sheet 3
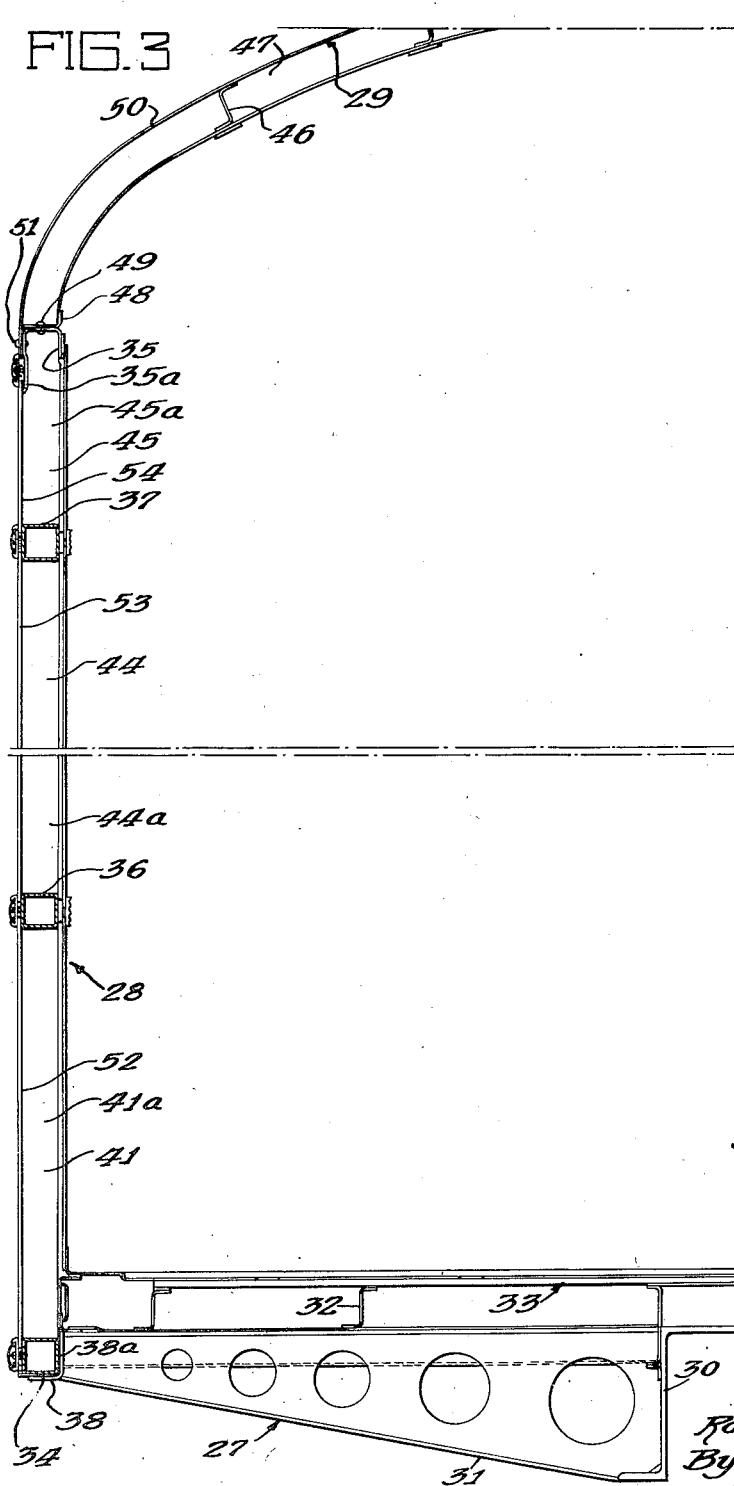
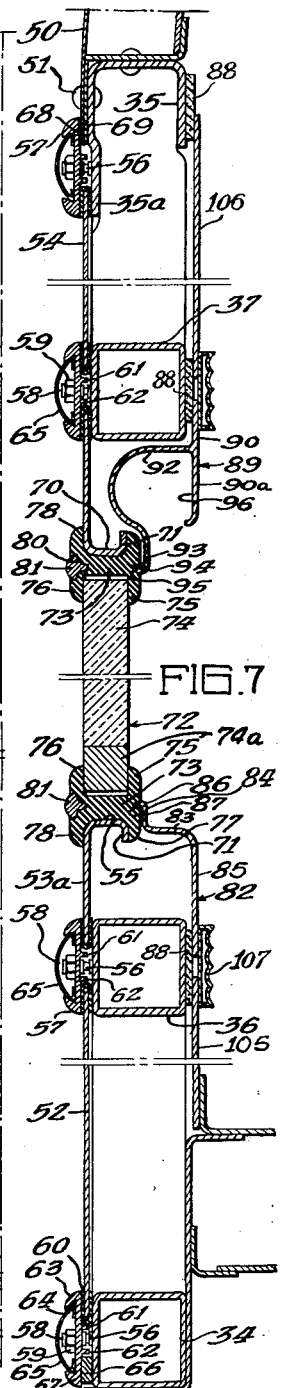
INVENTOR.
Robert A. Meldrum
By Zahl & Gritzbaugh
Attorneys

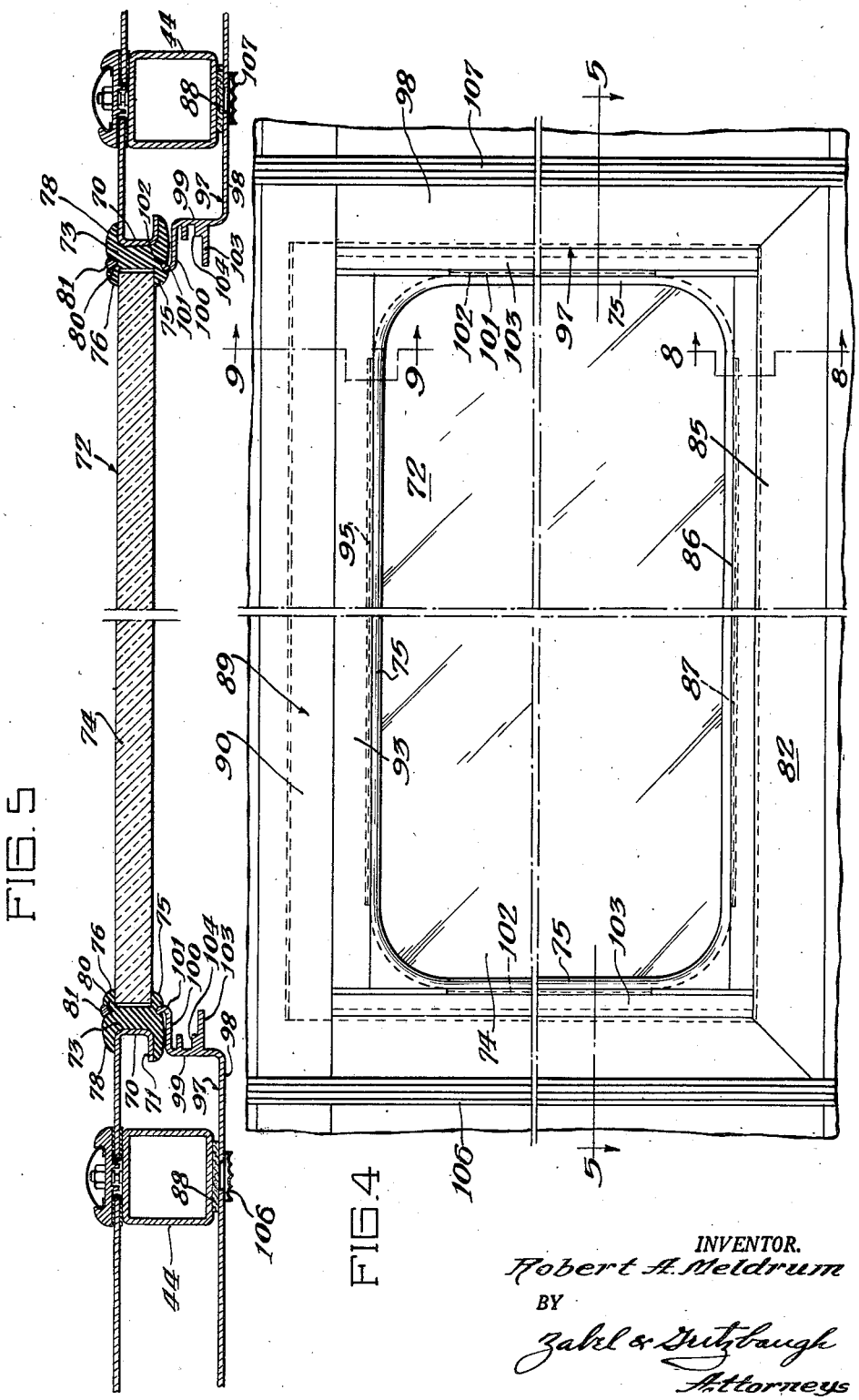

Oct. 5, 1954
R. A. MELDRUM
2,690,822
VEHICLE SIDE WALL
Filed Sept. 11, 1950
5 Sheets—Sheet 5
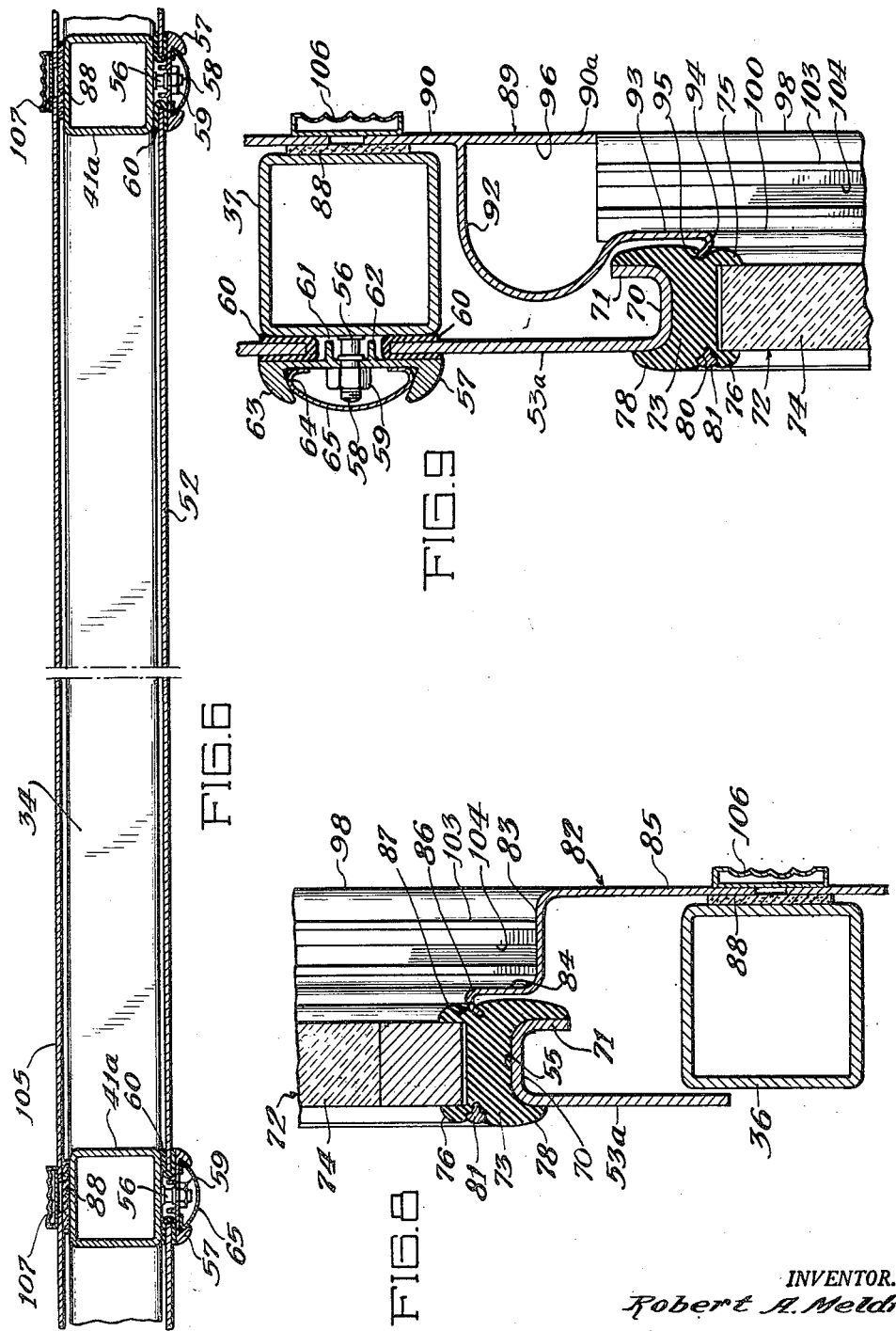
INVENTOR.
Robert A. Meldrum
BY
Zabel & Gritzbaugh
Attorneys Patented Oct. 5, 1954

2,690,822

UNITED STATES PATENT OFFICE 2,690,822

VEHICLE SIDE WALL

Robert A. Meldrum, Chicago, Ill., assignor to Pullman-Standard Car Manufacturing Company, Chicago, Ill., a corporation of Delaware Application September 11, 1950, Serial No. 184,225

9 Claims. (Cl. 189—64)

The present invention relates to a vehicle such as a railway car and particularly to the side wall construction including the sheathing, and windows and their attachment to the wall framing members.

An important object of the invention is to provide side sheathing and window structures that are adapted for use on numerous different vehicle structures with various window spacings. Standard shapes and sizes of sheathing and window parts can be used in different combinations to fit many different conditions of window and side post spacings. This facilitates the fabrication of vehicle bodies by mass production methods resulting in the reduction in time and costs and all of the other advantages derived from quantity production.

Other objectives of the invention include such considerations as utilization of light weight materials, ease of fabrication and neatness and general appearance of the finished wall. The finished wall is strong and weathertight and the sheathing panels forming part of the wall are maintained substantially free from stresses that normally cause the unsightly buckles and wrinkles so commonly present in the sheathing of railroad car side walls.

The foregoing constitute some of the principal objects and advantages of the present invention, others of which will be apparent from the following description and the drawings, in which:

Fig. 1 is a diagrammatic side elevational view of a railroad car mounted on trucks;

Fig. 2 is a side elevational view of a car side wall as viewed from the outside of a car, a portion of the sheathing being broken away to illustrate the framing and the side wall embodying the present invention;

Fig. 3 is a vertical, transverse, sectional view taken through the railroad car diagrammatically illustrated in Fig. 1;

Fig. 3A is a view similar to Fig. 3 but on a smaller scale and showing a complete section of the car;

Fig. 4 is an enlarged side elevational view of a window panel embodying the present invention;

Fig. 5 is a horizontal sectional view through the window panel, the view being taken along the line 5—5 of Fig. 4;

Fig. 6 is a horizontal sectional view through one of the girder panels and the corresponding car framing members, showing the view being taken along the line 6—6 of Fig. 1;

Fig. 7 is an enlarged, vertical, sectional view taken through the car side wall, the view being taken along the line 7—7 of Fig. 1;

Fig. 8 is an enlarged, vertical sectional view taken through the lower or sill portion of the window panel, the view being taken along the line 8—8 of Fig. 4; and Fig. 9 is an enlarged, vertical, sectional view taken through the upper portion of the window panel, the view being taken along the line 9—9 of Fig. 4.

For purposes of illustration one embodiment of the present invention is shown and will be described hereinafter. It is recognized, however, that modifications may be made in the particular embodiment illustrated without departing from the intended scope of the invention.

Referring now to the drawings and particularly to Fig. 1, the present invention is illustrated as being embodied in a railway car generally indicated at 25 that is mounted on spaced car trucks diagrammatically illustrated by pairs of wheels 26.

As best shown in Fig. 3, the car body comprises generally an underframe 27, side frames generally indicated at 28 and a roof generally indicated at 29. Spaced end walls (not shown) are disposed at the opposite ends of the car body and complete the enclosure. The underframe 27 broadly includes a center sill 30 that extends throughout the length of the car body and a plurality of transverse members including cross bearers 31 that extend in opposite directions from the center sill 30 to a side wall of the car, end sills and bolsters. Mounted on these cross bearers 31 are a plurality of longitudinally disposed floor stringers 32 upon which a floor generally indicated at 33 is supported.

The present invention is concerned with the side walls 28, each of which comprises longitudinal framing members including a side sill 34 that is disposed at the bottom of the side wall and a side plate 35 mounted at the top of the side wall. Intermediate longitudinally disposed framing members include a belt rail 36 and a window header 37. Each of the side sills 34 is supported on and is attached to the underframe by means of angle members 38 that are suitably secured to the cross bearers 31. A closure plate 38a is disposed between each angle member 38 and the adjacent side sill 34.

As best shown in Fig. 2, the side frame also includes a pair of spaced end posts 39, one being located at each end of the side frame, and in the particular embodiment shown a door is located at one end of the side wall and hence is provided with a door post 40. The side framing as shown is made up essentially of three areas, one of which is disposed between the side sill 34 and the belt rail 36. For convenience, this region will be termed the girder panel area. In this region or area a girder or truss type of construction may be employed, but for purposes of illustration a truss type is shown. A plurality of longitudinally spaced vertical posts 41 are provided, between which are disposed diagonal truss members 42 (see Fig. 2).

Between the belt rail 36 and the window header 37 is an intermediate area or region in which a plurality of windows 43 are provided. Vertical posts 44 extend between the belt rail 36 and the window header 37. The exact location of these posts 44 insofar as their longitudinal spacing is concerned depends upon the size and spacing of the windows 43. The upper region of the side frame between the window header 37 and the side plate 35 will be called the letterboard area where a plurality of vertical posts 45 are disposed and are spaced apart throughout the length of the car side.

Referring to Fig. 3A, the car roof 29 spans the distance between and is secured to the side plates 35 and comprises longitudinal roof framing members 46, between which are disposed a plurality of roof carline members 47. A plate 48 is disposed longitudinally along each side edge of the roof 29 and this plate is riveted as at 49 (see Fig. 3) to the side plate 35. The roof 29 also includes roof sheathing 50 that projects below the side plate 35 at each side of the roof and is riveted as at 51 to the side plate 35.

As best shown in Fig. 2 the sheathing for the car side wall is divided into panels that may be identified as girder panels 52, intermediate panels 53 and letterboard panels 54. As shown these various panels are arranged in groups or sections that are repeated throughout the length of the car side wall, each group including one girder sheet or panel 52, at least three intermediate panels 53 and one letterboard panel 54. The girder panels 52 and the letterboard panels 54 are the same in length and each spans the same distance as the summation of the intermediate panels provided in the group.

Referring now to Fig. 2, at certain intervals throughout the length of the car side wall a set of posts 41, 44 and 45 are arranged in vertical alignment as indicated respectively at 41a, 44a and 45a so as to form in effect a continuous post from the side sill to the side plate. As can be seen from the drawings this particular arrangement of aligned posts occurs substantially at equal distances throughout the length of the car and the posts are spaced apart a distance approximately corresponding to three lengths of intermediate panels 53. Each of the girder panels 52 spans the distance between two adjacent series of aligned posts 41a, 44a and 45a and at its opposite ends overlies a portion of the posts 41a. At one end of the car side (shown at the right hand end as viewed in Fig. 2), the girder panel 52 extends to and partially overlies the car end post 39. This end post takes the place insofar as the girder panel is concerned, of a vertical post 41a. Each of the girder panels in height extends from the car side sill 34 to the belt rail 36 and overlies a portion of each of these longitudinal members.

Similarly each letterboard panel 54 extends between adjacent aligned vertical posts 41a, 44a and 45a and overlies a portion of posts 45a. In height each letterboard panel extends between the window header 37 and the side plate 35, and overlies a portion of each of these longitudinal members. Once again the right hand letterboard panel as viewed in Fig. 2 extends to the car end post 39 instead of to one of the vertical posts 45a.

Each of the intermediate panels 53 extends between adjacent posts 44 and overlies these posts for a portion of the width of the post. At the bottom and top respectively, the panel 53 extends between and overlies the belt rail 36 and the window header 37. As shown in Fig. 2 certain of the intermediate panels 53 are provided with window openings 55 and for purposes of convenience these particular panels will be referred to as window sash panels and will be identified by reference character 53a. As shown in Fig. 2 the panel 53b that is located at the right hand end of the car is only a fraction of the length of the other panels and it extends between the last vertical post 44 and the car end post 39.

The attachment of the girder panels, the intermediate panels and the letterboard panels to the framing members of the car side is accomplished in exactly the same manner and consequently it will be necessary only to describe the attachments in connection with one of these panels. Referring to Fig. 3 of the drawings a girder sheet panel 52 is indicated with its lower edge overlying a portion of the side sill 34 and its upper edge overlying a portion of the belt rail 36. As shown in Fig. 6 the girder panel 52 overlies at each of its ends one of the vertical posts 41a and is attached directly to these posts and to the side sill and belt rail.

Referring to Fig. 7 the side sill 34 is provided with a plurality of studs 56 spaced apart throughout the length of the side sill and each of these studs is securely welded to the outer face of the side sill. A retaining strip 57 coextensive in length with the distance between the car end post 39 and the door post 40 is apertured at spaced intervals throughout its length with the distance between adjacent apertures corresponding to the distance between adjacent studs 56. This retaining strip 57 is adapted to be attached to the outer face of the side sill 34 by being mounted on the studs 56 and each of these studs 56 is threaded as indicated at 58 to receive a nut 59.

The width of the retaining strips 57 corresponds with the width or height of the side sill 34 so that it overlaps the lower edge of the girder panel 52 when the latter is in proper position as shown in Fig. 6. A resilient gasket 60 made of hard rubber or some suitable resilient composition is placed over the peripheral edge of the girder panel 52 so that it is disposed over both the front and rear faces of the edge of the girder panel 52 in the region where the girder panel engages the retaining strip 57 and the side sill 34. The retaining strip 57 is then drawn down tightly against this gasket 60 so as to clamp the lower edge of the girder panel 52 securely against the side sill 34. An upper and lower reinforcing rib 61 and 62 respectively is provided on the rear face of the retaining strip 57 respectively above and below the stud 56. These ribs strengthen the retaining strip 57 to prevent its bending or warping as a result of the pressure exerted by the spaced nuts 59 when they are drawn tight. Thus an even pressure is exerted by the retaining strip 57 against the lower edge of the girder panel 52 throughout its length. At the upper and lower edge respectively of the retaining strip 57 is an outwardly extending flange-like portion 63 that provides an undercut shoulder indicated at 64. An elongated finish strip 65 of spring-like material is snapped into place between these undercut shoulders 64 and in cross section this finish strip 65 is arcute in shape to cover or form a housing over the ends of the studs 56 and the nuts 59.

The foregoing description with respect to the attachment of the lower edge of the girder panel 52 to the side sill 34 is equally applicable to the attachment of the upper edge of the girder panel 52 to the belt rail 36, and also this description is applicable to the attachment of the side edges of the girder panel 52 to the vertical posts 41a. Thus those parts of the retaining strip and other associated members used to clamp the top and side edges of the girder panel to the belt rail and vertical post respectively, corresponding to the equivalent parts of the retaining strip previously described in detail, will be identified by the same reference characters. A resilient bar 66 of hard rubber or the like is disposed between the lower edge of the lowermost retaining strip 57 and the side sill 34 to balance the retaining strip 57 and permit it to properly clamp the lower edge of the girder panel 52. Such a resilient bar is not needed in connection with the other retaining strip assemblies shown.

At the top of the car side wall each of the letterboard panels 54 is similarly clamped by means of a retaining strip 57 and associate parts bearing the same reference characters previously described except in this instance the studs 56 are spaced throughout the length of the side plate 35 and are actually welded in place onto the arm 35a of the side plate to which both the letterboard panels 54 and the roof sheathing 50 are attached. As previously mentioned the roof sheathing 50 is riveted as at 51 to the side plate 35 but this sheathing extends down below the rivets 51 and underneath the upper portion of the adjacent retaining strip 57. Suitable sealing gaskets 68 and 69 are inserted on the outer and inner faces of the sheathing 50 so as to effect a seal against the weather.

The gaskets 60 previously described serve as a seal against the weather around the edges of all of the panels. At the same time these gaskets 60 provide floating sheathing panels so that little or none of the stress and strain that are taken by the side framing members can be transmitted into these sheathing panels. The various framing members including the side sills 34, the belt rails 36, window headers 37 and side plates 35 may be made of steel, whereas the various sheathing panels including the girder panels 52, the intermediate panels 53, 53a and 53b and the letterboard panels 54 may be made of aluminum. Under these circumstances the non-metallic gaskets 60 serve to prevent the electrolytic action between the dissimilar metals that would otherwise occur if the dissimilar metals were placed in contact with each other.

As previously mentioned certain of the intermediate panels 53 identified at 53a are provided with window openings 55. In these instances the panels are turned inwardly at the window openings 55 to provide inturned flanges 70 (see Figs. 7, 8 and 9) that are flared outwardly as at 71 at their innermost edges. Mounted in each of the window openings 55 on the inturned flange 70 is a window sash assembly generally indicated at 72 in Fig. 5.

This sash assembly comprises a resilient mounting band 73 of rubber or like material into which is mounted a pane of glass 74 or a window frame, one side of which is shown at 74a in Fig. 7. The glass in this latter instance is mounted in the frame and, of course, may be a single pane or two panes of glass of any of the well-known types of assemblies. This rubber mounting band is provided with inner and outer inturned flanges 75 and 76 respectively, that engage the inner and outer faces respectively, of the pane of glass 74 at the periphery thereof and thereby firmly wedge the glass pane into the band. Similarly the band is provided with inner and outer flange portions 77 and 78 respectively that project outwardly with respect to the center of the band so as to form a peripheral groove or seat indicated at 79 that fits over the inturned flange portion 70 and flared portion 71 of the window panel 53a (see Figs. 5 and 7 to 9 inclusive). This is likewise a wedge fit so that the window assembly 72 is firmly held on the panel 53a and is weather-tight. Reference to Fig. 5 will show the construction along the side edges of the window assembly.

An endless groove 80 is disposed in the outer face of the rubber mounting band 73 and extends continuously around the band. An endless bead 81 is adapted to be inserted and retained in the groove 80 to complete the assembly. This bead 81 is necessary as the final step in the assembly so as to rigidify the outer flanges 76 and 78 and wedge them into their position shown in Fig. 6.

On the inside of each side wall below each window is a finish panel in the form of a window sill member generally indicated at 82 in Figs. 7 and 8. This member comprises a horizontal portion 83 that serves as the sill, an upwardly extending panel portion 84 and a downwardly projecting panel portion 85. The upper edge of the upwardly projecting panel portion 84 is bent over as at 86 to form an engaging flange that enters a groove 87 that is disposed on the inner face of the mounting band 73. Mounted against the inner face of the belt rail 36 is a filler member 88 that may be made of compressed wood or the like. This member is preferably screwed to the belt rail 36. The downwardly projecting panel portion 85 of the window sill member 82 projects over this filler member 88 and is preferably screwed to it.

Above each sash assembly 72 is a finish panel in the form of a curtain box member generally indicated at 89 that is provided with an upwardly disposed panel portion 90 that may be screwed as at 91 to a filler member 88. This panel member 90 projects downwardly as at 90a to form one wall of the curtain box. Extending inwardly is a wall portion 92 that curves downwardly and terminates in a vertically disposed panel portion 93. The lowermost edge of this panel portion 93 is turned inwardly at 94 to enter a groove 95 in the inner face of the mounting band 73. The panel 90 and the walls 92 form a receptacle, the interior of which is indicated at 96 into which is mounted the conventional window curtain.

Referring now to Fig. 5 a finish panel in the form of a curtain guide member generally indicated at 97 is provided at each side of the window sash assembly 72. Each of these curtain guide members includes a panel portion 98 that may be screwed or otherwise secured to a filler member 88 mounted on adjacent vertical post 44. This curtain guide member 97 extends from the top to the bottom of the window assembly and projects inwardly at 99 toward the sash assembly 72 and then at its innermost edge is provided with a portion 100 that is substantially parallel to the panel portion 93. The free end is turned to provide a flange 101 that enters a groove 102 in the mounting band 73. A wall 103 is disposed in parallel spaced relationship with respect to the portion 100 and serves as a light excluding member, back of which the window curtain is normally disposed. A groove or track 104 is provided to guide the conventional roller (not shown) on the curtain.

When assembling the window the pane of glass 74 is first inserted in the rubber mounting and sealing band 73 and the resulting unit is worked into the window opening and is mounted on the flange portion 70 of the panel 53a. The bead 81 is then installed and the panel 53a may be clamped onto the car framing members. Next the curtain box member 89 is installed by first inserting the flange edge 94 into the groove 95 of the rubber mounting and sealing band 73 and during this time the box member 89 is disposed at a position removed from the adjacent window header 37. The curtain box member is then swung in a counterclockwise direction as viewed in Fig. 7 until it engages the filler member 88 and then the screws 91 are applied to attach the panel portion 90 to the filler member 88. The sill member 82 and the curtain guide members 97 are similarly attached.

Mounted on the inside of the car behind the girder panel 52 is an interior finish panel 105 (see Fig. 7) that is secured by means of screws or the like along its upper edge to the filler member 83 that is disposed on the inner face of the belt rail 36. Along the side edges (see Fig. 6) the panel 105 is similarly attached with respect to the adjacent vertical post. This panel 105 extends downwardly to a position at floor level as shown in Fig. 7. Similarly a panel 106 is disposed on the inside of the car behind each of the letterboard panels 54 and this panel is also screwed or otherwise suitably attached to a filler member, which in turn is fastened to the adjacent framing member. Finish strips 107 cover the edges of the panels 105 and 106 as well as the edges of panel portions 85, 90 and 98.

I claim:

1. A side wall assembly for a vehicle comprising a framing member, a plurality of aligned studs spaced apart along the framing member and projecting outwardly therefrom, a sheathing panel disposed adjacent to the framing member with one edge overlying the framing member, a retaining strip adapted to extend lengthwise along the framing member and to clamp the edge of the panel against the framing member and having aligned apertures to pass over the studs, the free end of each stud being threaded to receive a nut, a finish strip adapted to fasten to the retaining strip and to cover the nuts, and resilient gasket means disposed between one surface of said panel and said framing member and between the other surface of said panel and said retaining strip.

2. A side wall assembly for a vehicle comprising framing members arranged in the form of a rectangle, a sheathing panel spanning the area enclosed by the framing members and overlying one side of the framing members, clamping means including elongated retaining strips fixed to the framing members and adapted to engage and clamp the panel with respect to the framing members, resilient gasket means between the panel and the framing members and retaining strips, and a finish panel spanning the area enclosed by the framing members and overlying the other side of the framing members, and means rigidly fixing the finish panel to the framing members.

3. A side wall assembly for a vehicle comprising framing members arranged in the form of a rectangle, a resiliently mounted flexible sheathing panel spanning the area enclosed by the framing members and overlying the framing members on one side thereof, means attaching the panel to the framing members, a finish panel spanning the area enclosed by the framing members, and means rigidly attaching the finish panel to the framing members on the other side thereof, said attaching means including clamping members frictionally engaging all four marginal edges of said panel to maintain the same in coplanar relationship, and resilient means disposed on both sides of said marginal edges and having a dimension parallel to the plane of said panel which is greater than its thickness dimension to permit the same to absorb substantial shearing stress incidental to the displacement of said clamping means and said framing members, with respect to said flexible panel, without causing said panel to buckle.

4. A side wall assembly as claimed in claim 1 in which said retaining strip is provided with a reinforcing rib on its rear face, said rib being offset from said aligned apertures so that it will be uninterrupted thereby so as to provide a continuous reinforcing rib.

5. A side wall assembly as claimed in claim 1 in which said retaining strip is provided with outwardly extending flange-like portions providing oppositely disposed undercut shoulders, and in which said finish strip is formed of resilient stock and is bowed in the direction of its width, the marginal portions of said finish strip interlocking with said undercut shoulders so that said finish strip is held in place by its own resilience.

6. In a vehicle of the type having structural side wall framing members subjected to slight relative movement incident to the stresses occasioned by the movement of the vehicle, a side wall contruction comprising a plurality of vertical and horizontal structural members arranged to form rectangular openings, a plurality of rectangular sheathing panels, one for each opening, overlying said openings, the edges of said panels being spaced from each other, said structural members being provided with studs welded thereto and projecting outwardly between the spaced edges of adjacent panels, and means for securing each of the four marginal portions of each of said panels to said structural members in such a manner that the slight relative movement of said structural members with respect to each other when subjected to said stresses will not cause buckling of said panels, said means comprising a retaining strip overlying the marginal portions of two adjacent panels, and having perforations registering with said studs so that said studs extend through said retaining strip, said retaining strip being provided with a pair of longitudinally extending continuous reinforcing ribs extending inwardly between said spaced panel edges and toward said structural member, said ribs being disposed on either side of said studs, nuts on said studs for urging said retainer strip toward said structural member to clamp the marginal portions of adjacent panels, and resilient gasket means disposed between one surface of said marginal portions and their associated structural member, and between the other surface of said marginal portions and said retainer strip to absorb the movement of said structural member with respect to said sheathing panel to the end that buckling stresses will not be transmitted to said sheathing panel.

7. A side wall construction as claimed in claim 6 in which said structural members and said sheathing panels are of dissimilar metals, and in which said resilient gasket means serves to maintain said dissimilar metals out of contact with each other in order to prevent electrolytic action therebetween.

8. A side wall assembly as claimed in claim 1 in which said sheathing panel is provided with a window opening therein.

9. A side wall assembly for a vehicle comprising framing members arranged in the form of a rectangle, a sheathing panel spanning the area enclosed by the framing members and overlying one side of the framing members, clamping means including elongated retaining strips fixed to the framing members and adapted to engage and clamp the panel with respect to the framing members, resilient gasket means between the panel and the framing members and retaining strips, said sheathing panel having a window opening therein, resilient pane mounting means disposed in said window opening, a glass pane resiliently held in said window opening by said resilient pane mounting means and supported by said sheathing panel, a finish panel spanning the area between said window opening and an adjacent framing member and overlying the other side of said framing member, means rigidly securing one edge of the finish panel to said framing member in parallel spaced relationship with respect to said sheathing panel, and means securing another edge of said finish panel to the resilient pane mounting means.

References Cited in the file of this patent

UNITED STATES PATENTS

| Number | Name | Date |
|---|---|---|
| 878,539 | Kiesel | Feb. 11, 1908 |
| 1,031,060 | Gibbs | July 2, 1912 |
| 1,335,756 | Scarff | Apr. 6, 1920 |
| 1,921,303 | Raschka | Aug. 8, 1933 |
| 2,178,817 | Small | Nov. 7, 1939 |
| 2,297,051 | Dean | Sept. 29, 1942 |
| 2,407,086 | Ledwinka | Sept. 3, 1946 |
| 2,480,321 | Clarke | Aug. 30, 1949 |
| 2,497,276 | Scott et al. | Feb. 14, 1950 |

FOREIGN PATENTS

| Number | Country | Date |
|---|---|---|
| 524,296 | Great Britain | 1940 |